United States Patent
Mimura et al.

[19]

[11] Patent Number: 5,934,703
[45] Date of Patent: Aug. 10, 1999

[54] COLLISION SENSING APPARATUS

[75] Inventors: Etsuhisa Mimura; Shuichi Ishimoto, both of Susono, Japan

[73] Assignee: Toyota Jidosha Kabushiki Kaisha, Toyota, Japan

[21] Appl. No.: 08/844,789

[22] Filed: Apr. 22, 1997

[30] Foreign Application Priority Data

May 16, 1996 [JP] Japan .................................. 8-121494
Feb. 27, 1997 [JP] Japan .................................. 9-044228

[51] Int. Cl.⁶ .................................................. B60R 21/16
[52] U.S. Cl. .......................................... 280/734; 180/274
[58] Field of Search .......................... 180/274; 280/734, 280/735, 730.2

[56] References Cited

U.S. PATENT DOCUMENTS 5,145,208  9/1992  Hoagland et al. ....................... 280/734
5,707,076  1/1998  Takahashi .............................. 280/735

FOREIGN PATENT DOCUMENTS 43 09 827   9/1994  Germany .
6-64491     3/1994  Japan .
8-67227     2/1996  Japan .
95/31357   11/1995  WIPO .

Primary Examiner—Kenneth R. Rice
Attorney, Agent, or Firm—Pillsbury Madison & Sutro LLP

[57] ABSTRACT

A collision sensing apparatus for detecting a side collision of a vehicle includes an acceleration sensor disposed on a frame member of the vehicle. The sensor is capable of detecting an acceleration occurring due to a side collision against a center pillar from an outer direction of the vehicle. The sensor is also capable of detecting an acceleration occurring as a result of a transmission of a displacement load based on a deformation of a door and oriented toward an interior of a vehicle compartment that occurs due to a side collision against the door from an outer direction of the vehicle.

16 Claims, 11 Drawing Sheets

COLLISION SENSING APPARATUS

BACKGROUND OF THE INVENTION

1. Field of the Invention

The present invention relates to a collision sensing apparatus, and more particularly to a collision sensing apparatus for detecting a side collision of a vehicle.

2. Description of the Related Art

Conventionally, collision sensing apparatuses are known which detect a collision from a lateral direction of a vehicle at the time of a collision of the vehicle and actuate an air bag apparatus to deploy an air bag between an inner side portion of the vehicle and a side portion of the vehicle. One example of such collision sensing apparatuses is disclosed in Japanese Patent Application Laid-Open (JP-A) No. 6-64491.

Further, in relation to collision sensing apparatuses, a method and apparatus for supplying inflating signals for inflating an air bag device are disclosed in Japanese Patent Application Laid-Open (JP-A) No. 8-67227, and actuating apparatuses for air bag devices are disclosed in International Application Publication No. wo95/31357 and German Patent No. DE4309827A1.

As shown in FIG. 11, inside a seat 70, this collision sensing apparatus is provided with an air bag apparatus 72 and a sensor 76 for actuating the air bag apparatus 72 to inflate an air bag body 74 accommodated in the air bag apparatus 72. This sensor 76 is disposed at an end of a frame 78 of a seat cushion 70A of the seat 70.

With this collision sensing apparatus, however, since collision over a wide range are detected by a single sensor, the sensor 76 is arranged to be operated by a collision load at the time of a side collision which is transmitted by means of a plastic block provided in the door and a frame member provided in the seat 70. For this reason, the weight and cost of the apparatus increase substantially.

SUMMARY OF THE INVENTION

In view of the above-described circumstances, it is an object of the present invention to provide a collision sensing apparatus which is capable of preventing a substantial increase in the weight and cost and is capable of detecting in a short time a side collision against the door and the center pillar over a wide range by a single acceleration sensor in a short time.

To this end, in accordance with a first aspect of the present invention, there is provided a collision sensing apparatus for detecting a side collision of a vehicle, comprising: an acceleration sensor disposed on a frame member of the vehicle, capable of detecting an acceleration occurring due to a side collision against a center pillar from an outer direction of the vehicle, and capable of detecting an acceleration occurring as a result of a transmission of a displacement load based on a deformation of a door and oriented toward an interior of a vehicle compartment that occurs due to a side collision against the door from an outer direction of the vehicle.

Accordingly, when another vehicle laterally collides against the center pillar, the acceleration sensor provided on the frame member detects an acceleration occurring in the frame member. In addition, when the other vehicle laterally collides against the door, the displacement load is transmitted to the frame member due to the deformation of the door toward the interior of the vehicle compartment, and an acceleration occurring due to this displacement load is detected by the acceleration sensor provided on the frame member. For this reason, the side collision against the door and the center pillar over a wide range can be detected by a single acceleration sensor in a short time. In addition, since it is unnecessary to add additional members as in the conventional structure, it is possible to prevent a substantial increase in the weight and cost.

In accordance with a second aspect of the present invention, in the collision sensing apparatus according to the first aspect of the invention, the acceleration sensor is mounted so as to be relatively displaceable with respect to the frame member in conjunction with the deformation of the door toward the interior of the vehicle compartment.

Accordingly, the acceleration sensor provided on the frame member of the vehicle undergoes relative displacement with respect to the frame member in conjunction with the deformation of the door toward the interior of the vehicle compartment due to a side collision by another vehicle. Accordingly, before the impact caused by the deformation of the door is detected by the acceleration sensor via the frame member of the vehicle, the acceleration sensor is capable of speedily detecting an acceleration occurring due to the relative displacement of the door toward the interior of the vehicle. As a result, it is possible to detect the side collision more speedily.

In accordance with a third aspect of the present invention, in the collision sensing apparatus according to the first or second aspect of the invention, the acceleration sensor is mounted at a position on the frame member which is located between a longitudinally central portion of the door and a pillar provided in the rear of the door.

Accordingly, even in the event that another vehicle has collided laterally against the center pillar and the door in a different form of collision such as one from a diagonal direction or the like, such a side collision can be detected effectively by the acceleration sensor disposed at a position on the frame member located between the longitudinal center of the door and the pillar at the rear of the door, i.e., at a position on the frame member which constitutes a side position for a vehicle occupant. For this reason, the side collision over a wide range can be detected by a single acceleration sensor irrespective of the form of its collision without causing a delay in detection.

The above and other objects, features and advantages of the present invention will become more apparent from the following detailed description of the invention when read in conjunction with the accompanying drawings.

DESCRIPTION OF THE PREFERRED EMBODIMENTS

Figure 1:
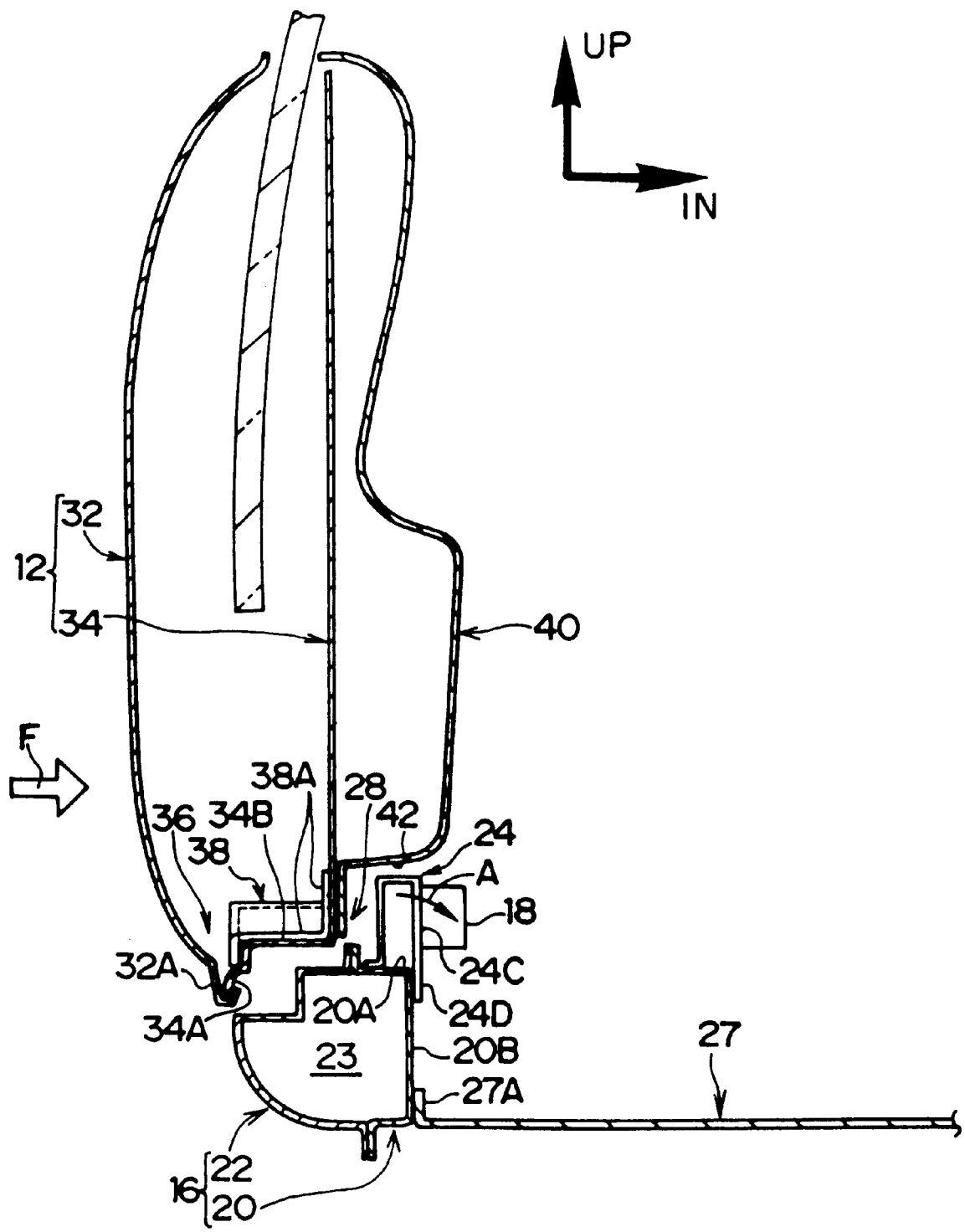
FIG. 1 is a cross-sectional view, taken from the rear direction of the vehicle, of the collision sensing apparatus in accordance with a first embodiment of the present invention.

Referring now to FIGS. 1 to 4, a description will be given of a first embodiment of a collision sensing apparatus in accordance with the present invention.

It should be noted that, in the drawings, arrow FR indicates a forward direction of the vehicle, arrow UP indicates an upward direction of the vehicle, and arrow IN indicates a transversely inward direction of the vehicle.

Figure 3:
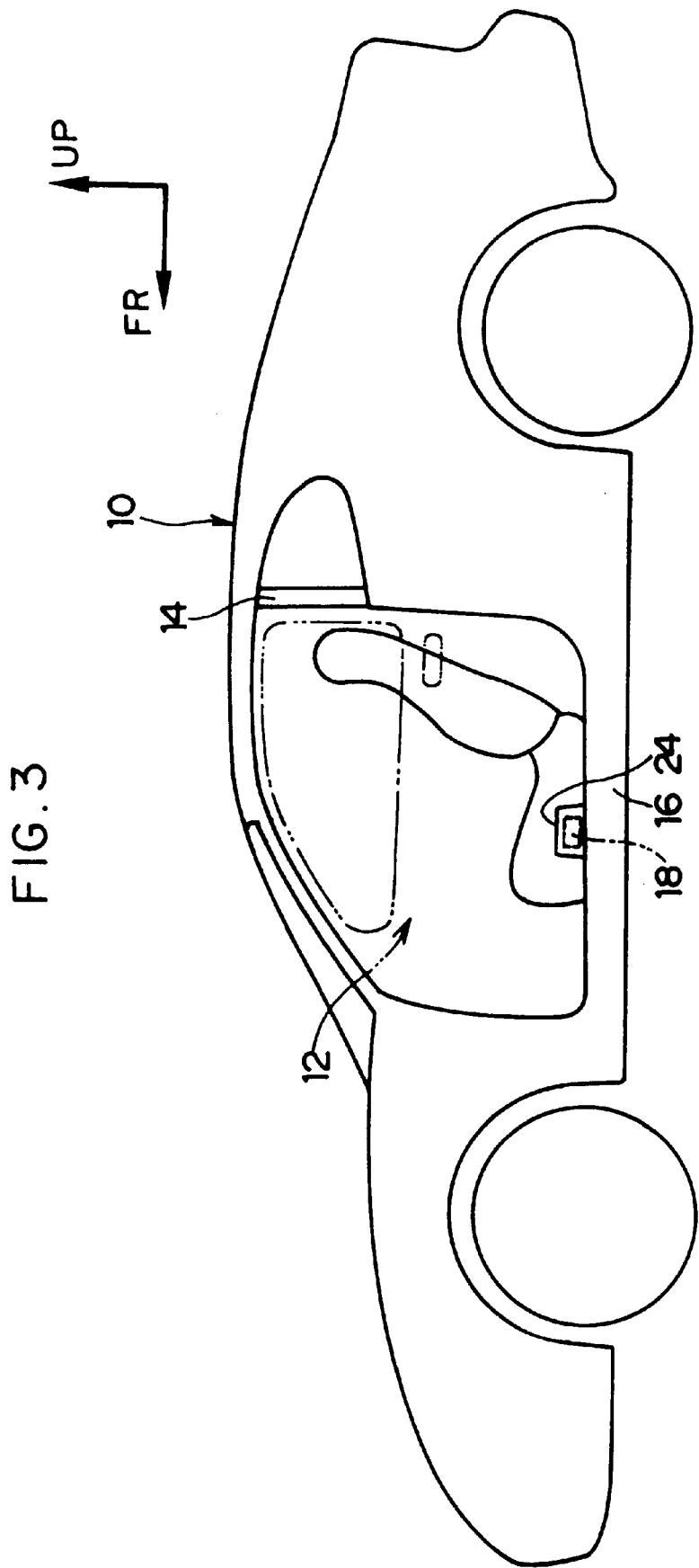
FIG. 3 is a schematic side elevational view illustrating a vehicle to which the collision sensing apparatus in accordance with the first embodiment of the present invention is applied.

As shown in FIG. 3, a vehicle 10 in this embodiment is a two-door vehicle. An acceleration sensor 18 is disposed on an upper portion of a side sill 16 serving as a frame member extending over a predetermined range between a longitudinal center of a front side door 12 and a B pillar (i.e., a center pillar) 14 located in the rear of the door.

Figure 2:
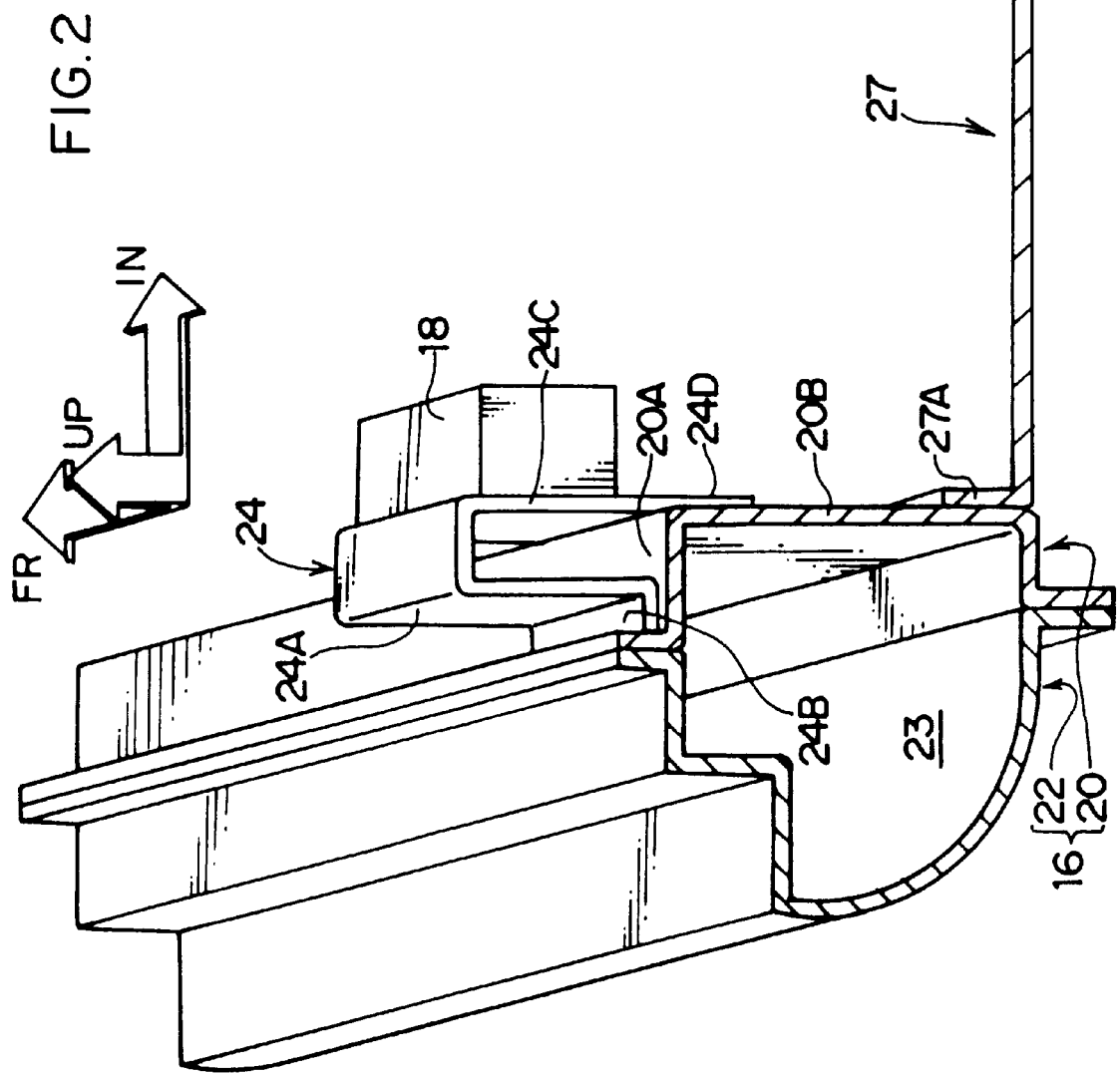
FIG. 2 is a perspective view, taken from a diagonally outward direction of the vehicle, of portions of the collision sensing apparatus in accordance with the first embodiment of the present invention.

As shown in FIG. 2, the side sill 16 is comprised of a side sill inner member 20 for constituting a vehicle inner side portion of the side sill 16 and a side sill outer member 20 for constituting a vehicle outer side portion of the side sill 16, and has a hollow portion 23 extending in the longitudinal direction of the vehicle. The acceleration sensor 18 is mounted on the side sill inner member 20 by means of a bracket 24 serving as a mounting member formed from a metal plate. The cross-sectional shape of the bracket 24, as viewed in the longitudinal direction of the vehicle, is substantially U-shaped with an opening facing downward, and a flange 24B is formed at a lower end of an upright wall portion 24A on its transversely outer side of the vehicle in such a manner as to project toward the transversely outer side of the vehicle. This flange 24B is joined to a top wall portion 20A of the side sill inner member 20. A lower end portion 24D of an upright portion 24C on a vehicle transverse inner side of the bracket 24 is joined to a vertical wall portion 20B of the side sill inner member 20. In addition, a flange 27A is joined to a lower end of the upright wall portion 20B of the side sill inner member 20 in such a manner as to extend upward from a transversely outer end of a floor panel 27.

As shown in FIG. 1, the acceleration sensor 18 is secured to an upper portion of the upright wall portion 24C on the vehicle transverse inner side of the bracket 24 by means of unillustrated fixing members such as screws. A lower portion of the front side door 12 in a closed state opposes the bracket 24 at a predetermined interval 28 therewith, the acceleration sensor 18 being mounted on the side of the bracket 24 which is opposite to the side thereof which faces the lower portion of the front side door 12. Accordingly, when the front side door 12 undergoes deformation in the transversely inward direction of the vehicle (i.e., in the IN direction) by more than a predetermined value, the bracket 24 is capable of being displaced substantially toward the interior of the vehicle compartment (i.e., in the direction of arrow A in FIG. 1) relative to the side sill 16.

The front side door 12 is comprised of a door outer panel 32 constituting a door outer side portion of the front side door 12 and a door inner panel 34 constituting a door inner side portion of the front side door 12. An outer peripheral portion 32A of the door outer panel 32 and an outer peripheral portion 34A of the door inner panel 34 are hemmed together over a range excluding an upper portion of the door.

A torque box 38 serving as a reinforcement member is disposed on a bottom portion 34B of the door inner panel 34 at a predetermined interval 36 with the door outer panel 32. A flange 38A is formed at an outer peripheral portion of the torque box 38, and the flange 38A is joined to the door inner panel 34.

In addition, a door trim 40 is attached to a vehicle compartment side portion of the door inner panel 34, and the bracket 24 is accommodated in a recessed portion 42 formed in a lower portion of the door trim 40 in a state in which the front side door 12 is closed.

Next, a description will be given of the operation of the first embodiment.

Figure 4:
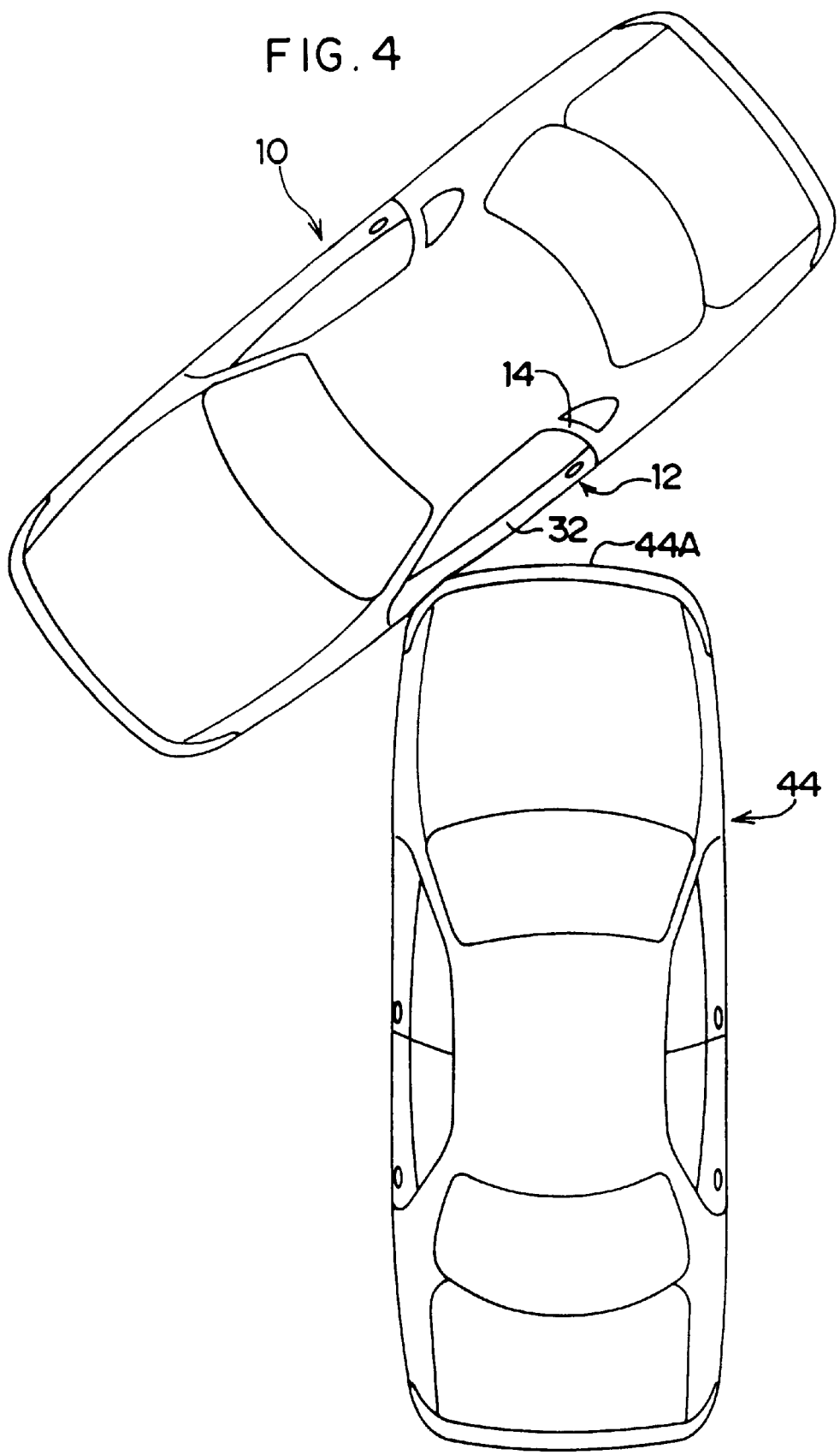
FIG. 4 is a schematic plan view illustrating a collision between another vehicle and the vehicle to which the collision sensing apparatus in accordance with the first embodiment of the present invention is applied.

In this first embodiment, as shown in FIG. 4, in the event that a bumper 44A of another vehicle 44 collides against the door outer panel 32 of the front side door 12 of the vehicle 10 in this embodiment, and an impact is applied laterally (i.e., in the direction of arrow F in FIG. 1) to the door outer panel 32 of the front side door 12 as shown in FIG. 1, the door outer panel 32 is first crashed, thereby decreasing the interval 36.

Next, the torque box 38 of the front side door 12 moves toward the interior of the vehicle compartment, and the interval 28 decreases. When the torque box 38 further moves toward the interior of the vehicle compartment, the torque box 38 abuts against the bracket 24 by means of the vehicle compartment side portion of the front side door 12, causing the bracket 24 to be displaced toward the interior of the vehicle compartment (i.e., in the direction of arrow A in FIG. 1) relative to the side sill 16. At this time, since the side sill 16 is a frame member of the vehicle 10, and is difficult to be displaced and moved as compared to the front side door 12 and the bracket 24, the bracket 24 is instantly displaced relative to the side sill 16.

For this reason, the impact is instantly transmitted to the acceleration sensor 18, so that the side collision of the front side door 12 can be detected by the acceleration sensor 18 within a short time. Incidentally, upon detection of the side collision by the acceleration sensor 18, an unillustrated air bag controlling device actuates an unillustrated known air bag apparatus for a side collision.

In the above-described manner, in the collision sensing apparatus in this first embodiment, the impact is transmitted in the order of the door outer panel 32 of the front side door 12, the torque box 38, the bracket 24, and the acceleration sensor 18, and since the side sill 16 is a frame member of the vehicle 10 and is difficult to be displaced and moved as compared to the front side door 12 and the bracket 24, the bracket 24 instantly undergoes relative displacement with respect to the side sill 16.

For this reason, before the impact caused by the deformation of the front side door 12 is detected by the acceleration sensor 18 via the side sill 16, the acceleration sensor 18 speedily detects an acceleration occurring due to the relative displacement of the bracket 24. Consequently, it is possible to detect the side collision of the front side door 12 reliably in a short time.

In addition, in the collision sensing apparatus in this first embodiment, in the event that the bumper 44A of the other vehicle 44 has collided against the B pillar (i.e., center pillar) 14 of the vehicle 10 in this embodiment, the impact transmitted from the B pillar (i.e., center pillar) 14 to the side sill 16 can be detected by the acceleration sensor 18.

As a result, it is unnecessary to provide an acceleration sensor on the B pillar (i.e., center pillar) 14, so that the side collision of the B pillar (i.e., center pillar) 14 can also be detected reliably by the single acceleration sensor 18 in a short time.

In the case of a minor side collision, since the impact can be absorbed as the intervals 28 and 36 are forcibly reduced, the acceleration level detected by the acceleration sensor 18 becomes small, thereby making it possible to prevent the actuation of the air bag apparatus.

In addition, as shown in FIG. 3, since the acceleration sensor 18 is disposed on an upper portion of the side sill 16 serving as a frame member which is located between a longitudinal center of the front side door 12 and the B pillar (i.e., center pillar) 14 at the rear of the door, i.e., at a position which constitutes a side position for a vehicle occupant seated in the seat, even in the event that another vehicle has collided laterally against the B pillar (i.e., center pillar) 14 and the front side door 12 in a different form of collision such as one from a diagonal direction or the like as shown in FIG. 4, such a side collision can be detected effectively by the acceleration sensor 18. For this reason, the side collision over a wide range can be detected by the single acceleration sensor 18 irrespective of the form of its collision without causing a delay in detection.

Further, since the present invention does not adopt the arrangement of a conventional structure in which the side collision over a wide range of the side portion of the vehicle is detected by adding additional members, it is possible to prevent a substantial increase in the weight and cost.

Figure 5:
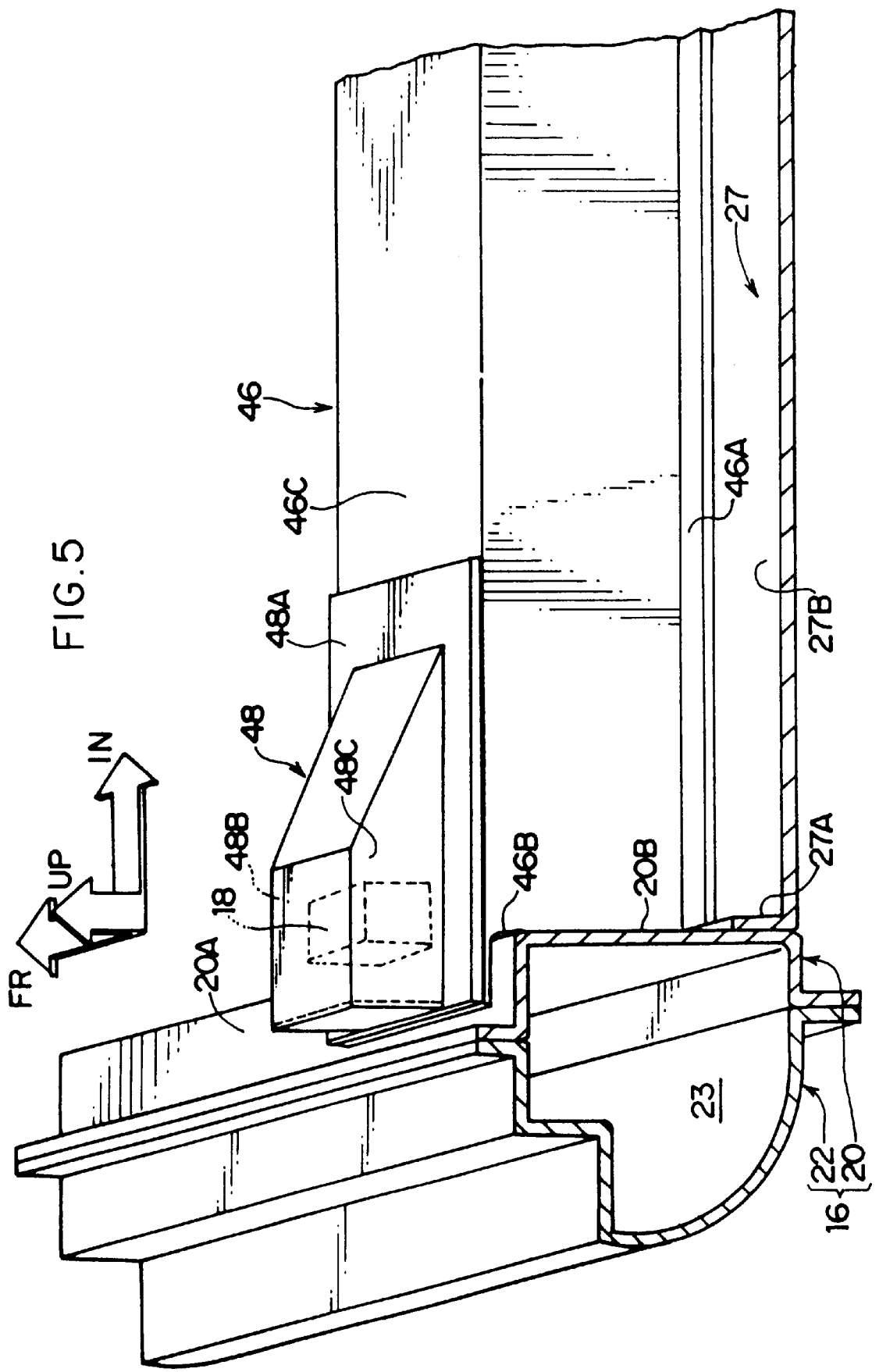
FIG. 5 is a perspective view, taken from a diagonally outward direction of the vehicle, of portions of the collision sensing apparatus in accordance with a second embodiment of the present invention.
Figure 6:
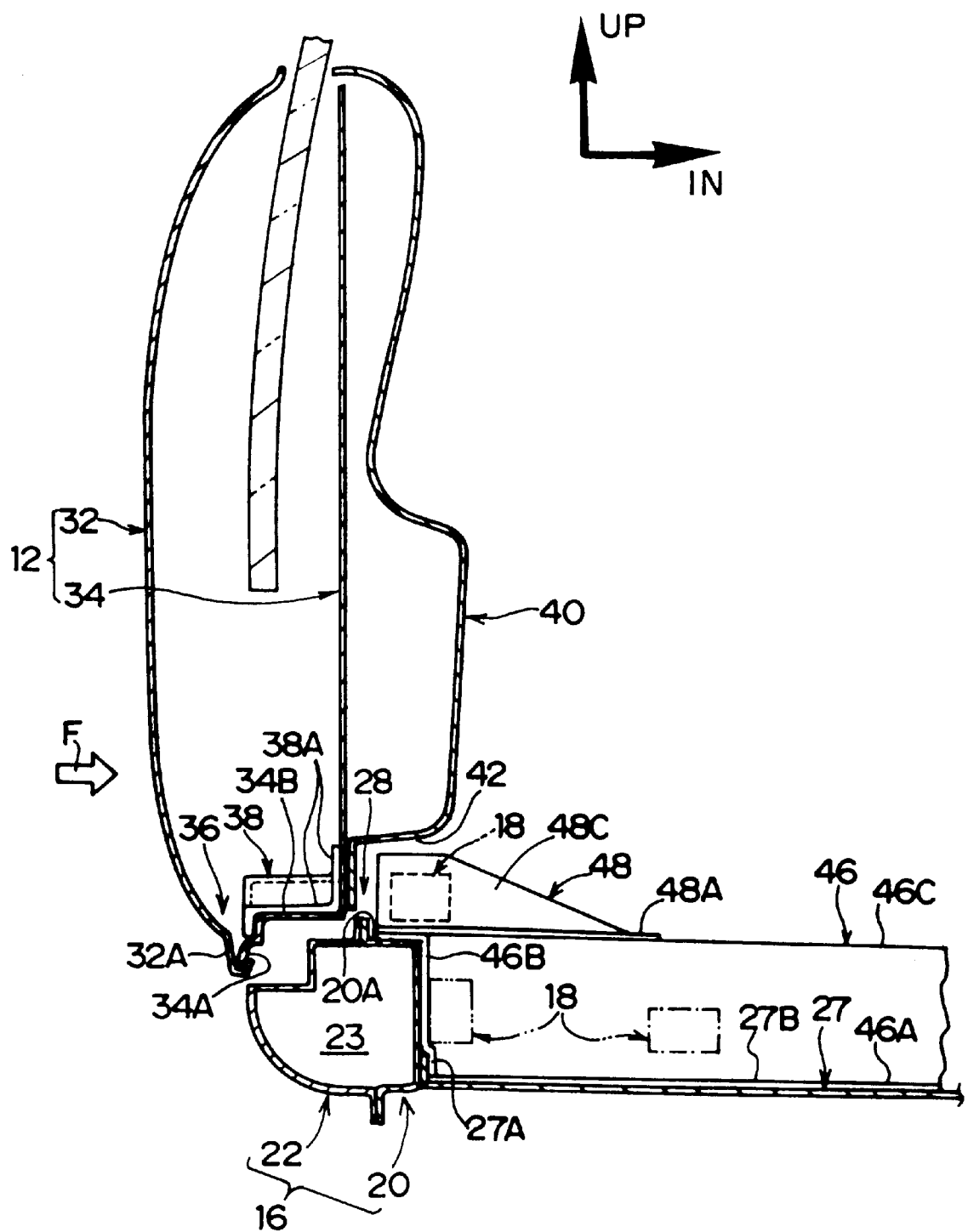
FIG. 6 is a cross-sectional view, taken from the rear direction of the vehicle, of the collision sensing apparatus in accordance with the second embodiment of the present invention.

Referring next to FIGS. 5 and 6, a description will be given of a second embodiment of the collision sensing apparatus in accordance with the present invention.

It should be noted that those component parts which are identical to those of the first embodiment will be denoted by the same reference numerals, and a description thereof will be omitted.

As shown in FIG. 5, in this second embodiment, a floor cross member 46 serving as a frame member of the vehicle 10 and extending in the transverse direction of the vehicle is disposed on the vehicle transverse inner side of the side sill 16. The cross-sectional view of this floor cross member 46, as viewed from the outer side in the transverse direction of the vehicle, is shaped in the form of a hat with its opening facing downward, and flanges 46A, which are respectively formed at a front end portion and a rear end portion of the opening, are joined to an upper surface 27B of the floor panel 27. In addition, a flange 46B, which is formed at a vehicle transverse outer end of the floor cross member 46, is joined to the side sill inner member 20.

A projecting portion 48 serving as a mounting portion is disposed in the vicinity of a vehicle transverse outer end of a top wall portion 46C of the floor cross member 46. This projecting portion 48 has a box-shaped configuration with its opening facing downward, and a flange 48A, which is formed around its outer periphery excluding a vehicle transverse outer side thereof, is joined to the top wall portion 20A of the side sill inner member 20 and the top wall portion 46C of the floor cross member 46.

The acceleration sensor 18 is disposed inside the projecting portion 48, and the acceleration sensor 18 is fixed to a vehicle front-side vertical wall portion 48B and a vehicle rear-side vertical wall portion 48C of the projecting portion 48 by means of unillustrated fixing members such as screws.

Next, a description will be given of the operation of the second embodiment.

In this second embodiment, as shown in FIG. 6, when an impact is applied laterally (i.e., in the direction of arrow F in FIG. 6) to the door outer panel 32 of the front side door 12, the door outer panel 32 is first crashed, thereby decreasing the interval 36. Next, the torque box 38 of the front side door 12 moves toward the interior of the vehicle compartment, and the interval 28 decreases. When the torque box 38 further moves toward the interior of the vehicle compartment, the torque box 38 abuts against the projecting portion 48 by means of the vehicle compartment side portion of the front side door 12, causing the impact to be transmitted to the acceleration sensor 18.

At this time, the side sill 16 and the floor cross member 46 are frame members of the vehicle 10, and are difficult to be displaced and moved as compared to the front side door 12. For this reason, the impact is instantly transmitted to the acceleration sensor 18, so that the side collision of the front side door 12 can be detected by the acceleration sensor 18 within a short time. Incidentally, upon detection of the side collision by the acceleration sensor 18, the unillustrated air bag controlling device actuates the unillustrated known air bag apparatus for a side collision.

In the above-described manner, in the collision sensing apparatus in this second embodiment, the impact is transmitted in the order of the door outer panel 32 of the front side door 12, the torque box 38, the projecting portion 48, and the acceleration sensor 18, and since the side sill 16 and the floor cross member 46 are frame members of the vehicle 10 and are difficult to be displaced and moved as compared to the front side door 12, the side collision of the front side door 12 can be detected by the acceleration sensor 18 in a short time.

In addition, in the event that the bumper of another vehicle has collided against the B pillar (i.e., center pillar) 14 of the vehicle 10 in this embodiment, the impact from the B pillar (i.e., center pillar) 14 is transmitted to the side sill 16 and the floor cross member 46, and can be detected by the acceleration sensor 18. Hence, it is unnecessary to provide an acceleration sensor on the B pillar (i.e., center pillar) 14, so that the side collision of the B pillar (i.e., center pillar) 14 can also be detected reliably by the acceleration sensor 18 in a short time.

Furthermore, in the case of a minor side collision, since the impact can be absorbed as the intervals 28 and 36 are forcibly reduced, the acceleration level detected by the acceleration sensor 18 becomes small, thereby making it possible to prevent the actuation of the air bag apparatus.

It should be noted that the projecting portion 48 may be formed integrally with the floor cross member 46. Further, the acceleration sensor 18 may be fixed to the inner side surface of the side sill inner member 20, as shown by the two-dotted dash line in FIG. 6.

Figure 7:
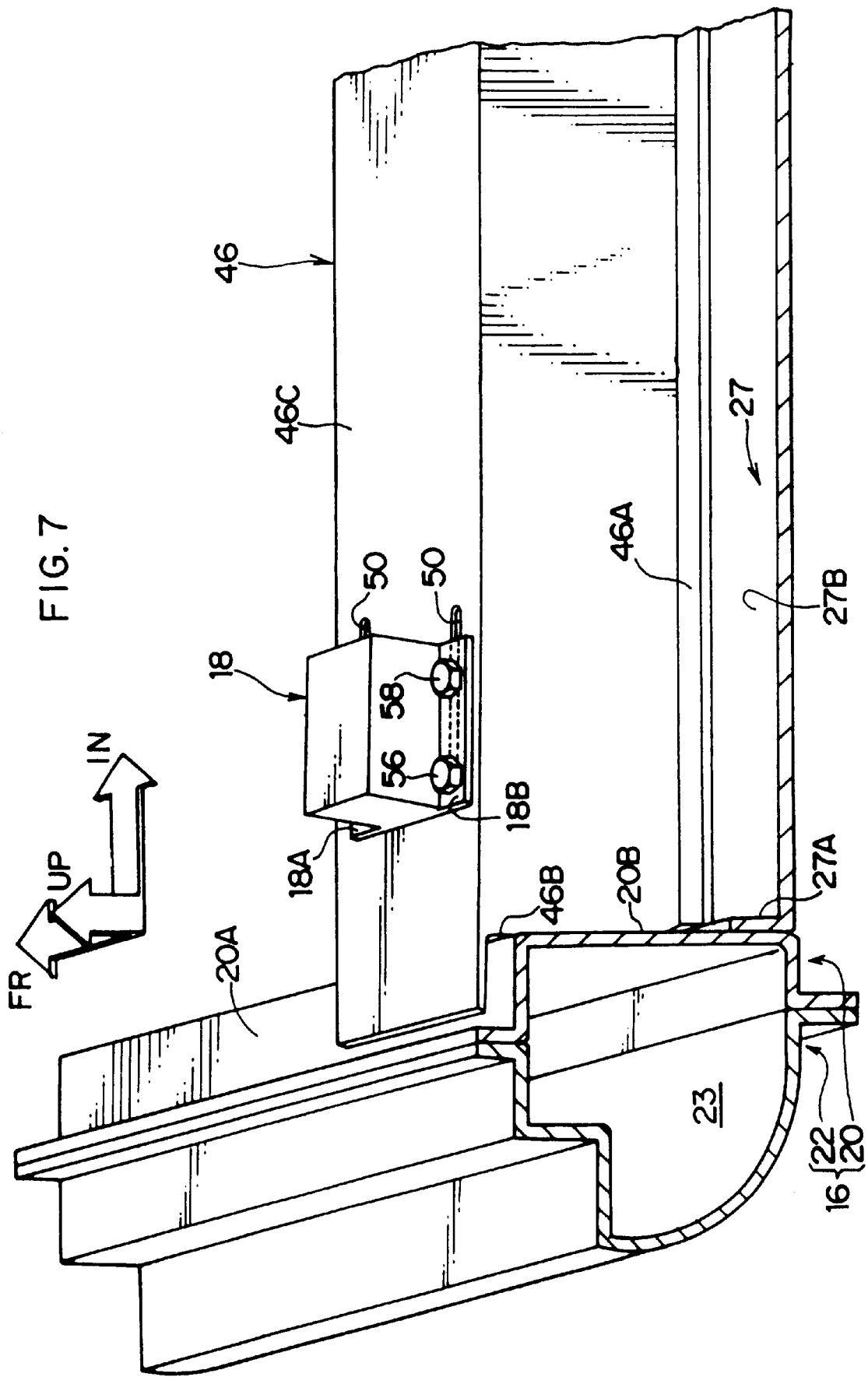
FIG. 7 is a perspective view, taken from a diagonally outward direction of the vehicle, of portions of the collision sensing apparatus in accordance with a third embodiment of the present invention.
Figure 8:
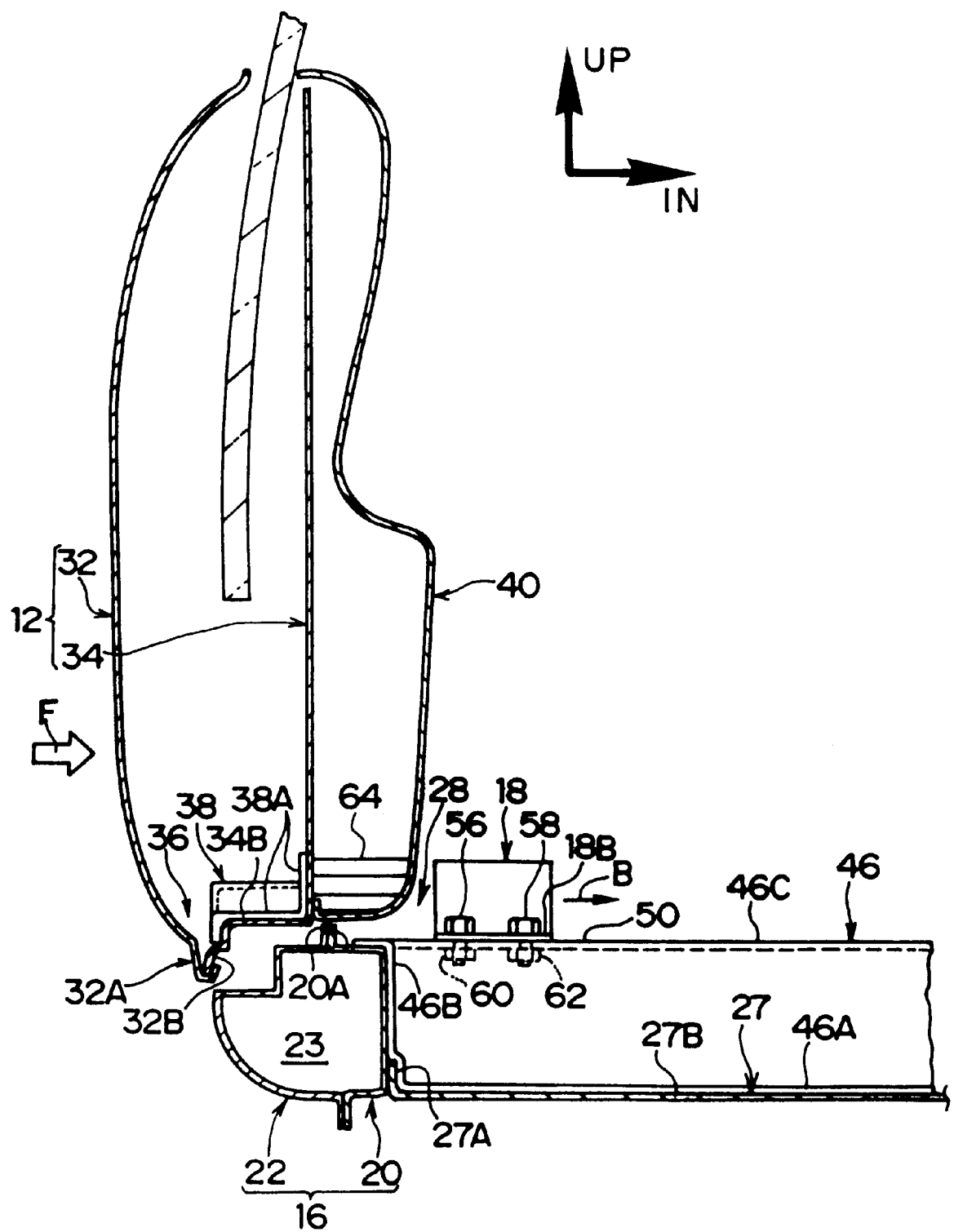
FIG. 8 is a cross-sectional view, taken from the rear direction of the vehicle, of the collision sensing apparatus in accordance with the third embodiment of the present invention.

Referring next to FIGS. 7 and 8, a description will be given of a third embodiment of the collision sensing apparatus in accordance with the present invention.

It should be noted that those component parts which are identical to those of the second embodiment will be denoted by the same reference numerals, and a description thereof will be omitted.

As shown in FIG. 7, in this third embodiment, a pair of slits 50 are formed in the vicinity of a vehicle transverse outer end of the top wall portion 46C of the floor cross member 46 in such a manner as to extend in the transverse direction of the vehicle. The acceleration sensor 18 is mounted on the top wall portion 46C of the floor cross member 46 in such a manner as to be movable along the slits 50 in the transverse direction of the vehicle.

The acceleration sensor 18 has a block-shaped configuration, and a pair of mounting flanges 18A and 18B serving as mounting members project in the forward and rearward directions of the vehicle, respectively. Unillustrated holes are formed in these mounting flanges 18A and 18B, and these mounting holes are arranged in face-to-face relation to the pair of slits 50.

As shown in FIG. 8, on the inner side of the floor cross member 46 nuts 60 and 62 serving as mounting members are threadedly engaged with bolts 56 and 58 which serve as mounting members and are passed through the pair of slits 50 and the mounting holes provided in the mounting flanges 18A and 18B of the acceleration sensor 18. The relationship among the tightening force for the bolts 56 and 58, the nuts 60 and 62, the shank diameter of the bolts 56 and 58, and the width of the slits 50 is set such that in a case where an external force whose component along the transversely inward direction of the vehicle exceeds a predetermined value is applied to the acceleration sensor 18, the acceleration sensor 18 moves in the transversely inward direction of the vehicle (in the direction of arrow B in FIG. 8) relative to the front side door 46.

In addition, a reinforcement member 64 having a honeycomb structure or the like is formed in a lower portion of the door trim 40 at a position where the reinforcement member 64 faces the acceleration sensor 18 with the floor cross member 12 closed.

Next, a description will be given of the operation of the third embodiment.

In this third embodiment, when an impact is applied laterally (i.e., in the direction of arrow F in FIG. 8) to the door outer panel 32 of the front side door 12, the door outer panel 32 is first crashed, thereby decreasing the interval 36. Next, the torque box 38 of the front side door 12 and the reinforcement portion 64 of the door trim 40 move toward the interior of the vehicle compartment, and the interval 28 decreases. When the torque box 38 and the reinforcement portion 64 further move toward the interior of the vehicle compartment, the reinforcement portion 64 abuts against the acceleration sensor 18 via the door trim 40, causing the acceleration sensor 18 to move toward the interior of the vehicle compartment (i.e., in the direction of arrow B in FIG. 8) relative to the floor cross member 46.

At this time, the floor cross member 46 is a frame member of the vehicle 10, and is difficult to be displaced and moved, so that the acceleration sensor 18 instantly moves together with the bolts 56 and 58 and the nuts 60 and 62 relative to the slits 50.

For this reason, the impact is instantly transmitted to the acceleration sensor 18, so that the side collision of the front side door 12 can be detected by the acceleration sensor 18 within a short time. Incidentally, upon detection of the side collision by the acceleration sensor 18, the unillustrated air bag controlling device actuates the unillustrated known air bag apparatus for a side collision.

In the above-described manner, in the collision sensing apparatus in this third embodiment, the impact is transmitted in the order of the door outer panel 32 of the front side door 12, the torque box 38, the reinforcement portion 64, and the acceleration sensor 18, and since the floor cross member 46 is a frame member of the vehicle 10 and is difficult to be displaced and moved, the acceleration sensor 18 instantly undergoes relative displacement with respect to the floor cross member 46.

For this reason, before the impact caused by the deformation of the front side door 12 is detected by the acceleration sensor 18 via the side sill 16 and the floor cross member 46, the acceleration sensor 18 speedily detects an acceleration occurring due to the relative displacement of the acceleration sensor 18. Consequently, it is possible to detect the side collision of the front side door 12 reliably in a short time.

In addition, in the event that the bumper of another vehicle has collided against the B pillar (i.e., center pillar) 14 of the vehicle 10 in this embodiment, the impact from the B pillar (i.e., center pillar) 14 is transmitted to the side sill 16 and the floor cross member 46, and can be detected by the acceleration sensor 18. Hence, it is unnecessary to provide an acceleration sensor on the B pillar (i.e., center pillar) 14, so that the side collision of the B pillar (i.e., center pillar) 14 can also be detected reliably by the single acceleration sensor 18 in a short time.

Furthermore, in the case of a minor side collision, since the impact can be absorbed as the intervals 28 and 36 are forcibly reduced, the acceleration level detected by the acceleration sensor 18 becomes small, thereby making it possible to prevent the actuation of the air bag apparatus.

Figure 9:
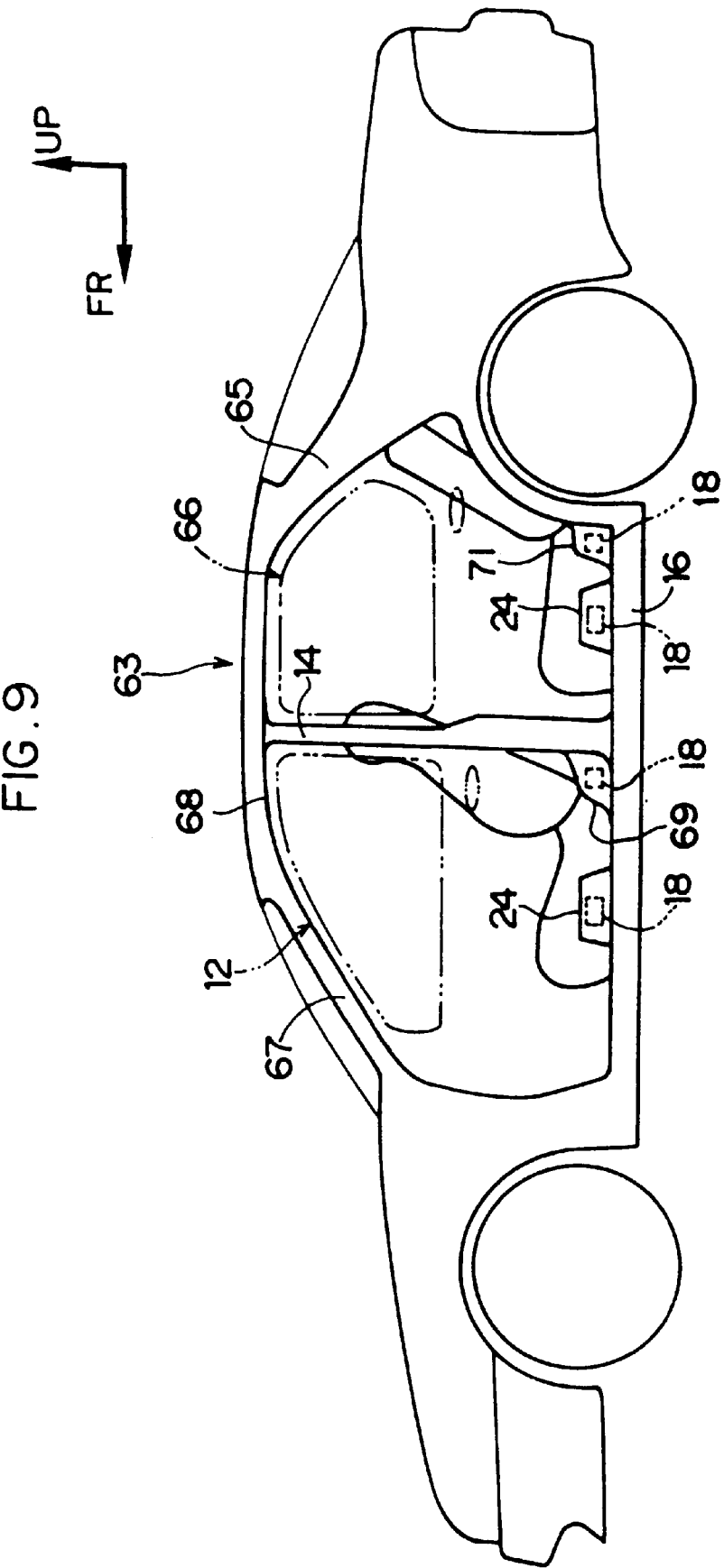
FIG. 9 is a schematic side elevational view illustrating a vehicle to which the collision sensing apparatus in accordance with a further embodiment of the present invention is applied.
Figure 10:
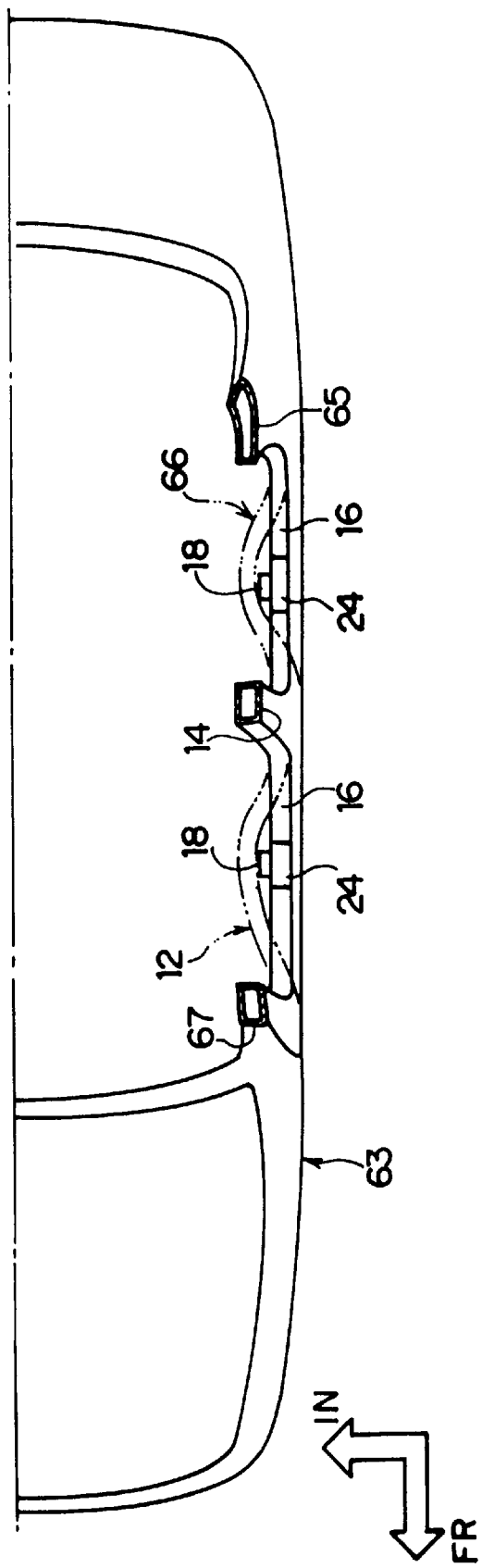
FIG. 10 is a schematic plan view illustrating a left half portion of the vehicle to which the collision sensing apparatus in accordance with the further embodiment of the present invention is applied.
Figure 11:
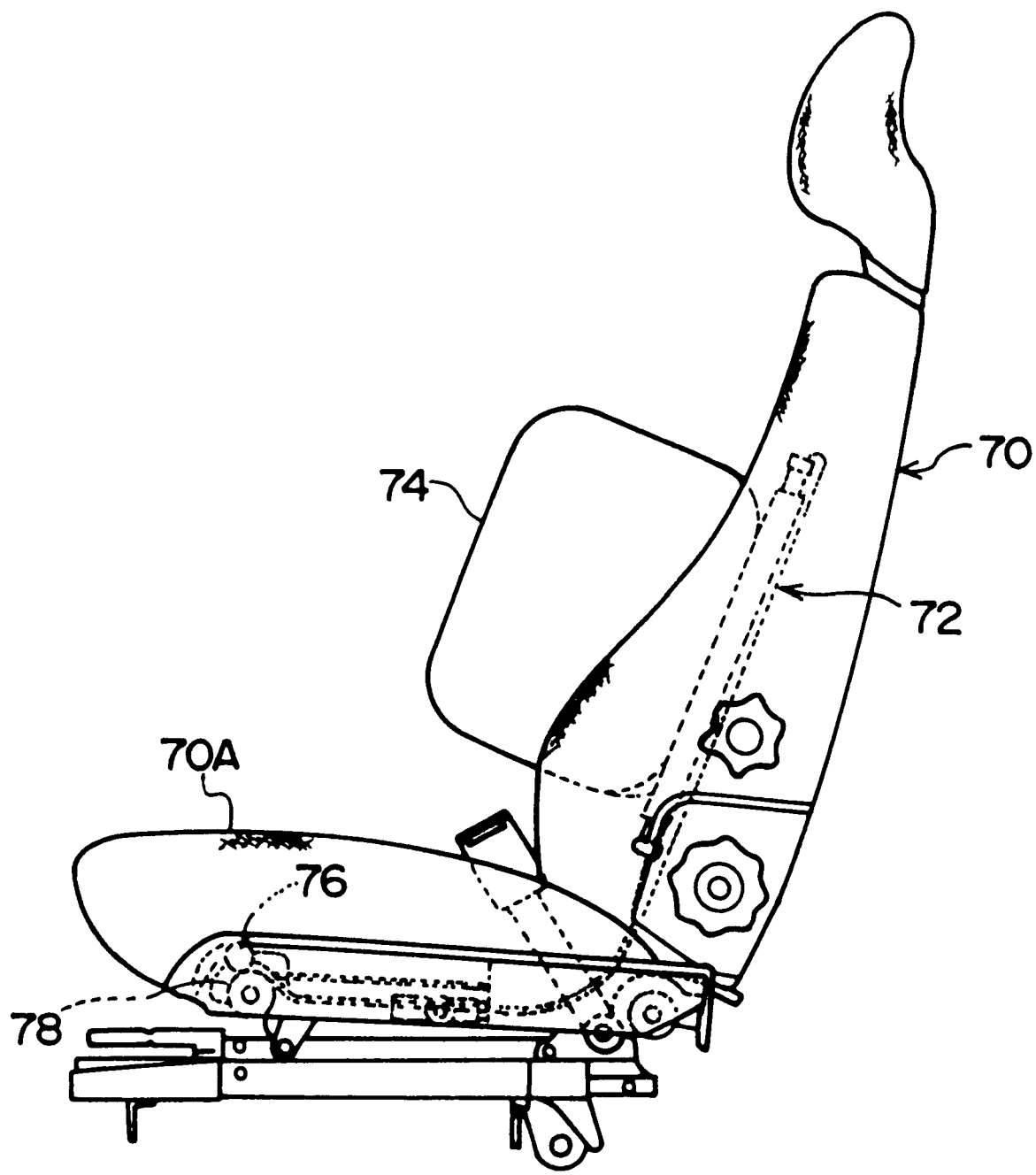
FIG. 11 is a schematic side elevational view illustrating a seat to which a collision sensing apparatus in accordance with the conventional art is applied.

Although, in the above, a detailed description has been given of specific embodiments of the present invention, the present invention is not limited to such embodiments, and it is apparent to those skilled in the art that various embodiments are possible within the scope of the present invention. For example, the present invention is also applicable to a four-door vehicle 63, as shown in FIGS. 9 and 10. In this case, the acceleration sensor 18 is additionally disposed on an upper portion of the side sill 16 at an intermediate position between the B pillar (i.e., center pillar) 14 and a C pillar (i.e., a quarter pillar) 55 in a rear side door 66, whereby even if the rear side door 66 is deformed toward the interior of the vehicle compartment due to a side collision as shown by the two-dotted dash lines in FIG. 10, the side collision of the rear side door 66 can be detected by the acceleration sensor 18 in a short time. Additionally, the acceleration sensors 18 may be mounted on an A pillar (i.e., a front pillar) 67, the B pillar (i.e., center pillar) 14, the C pillar (i.e., the quarter pillar) 65, a roof side rail 68, and the like insofar as the members where the acceleration sensors 18 are installed are frame members of the vehicle to which the impact is transmitted by the deformation of the door toward the interior of the vehicle.

Furthermore, in the case of the four-door vehicle 63, as shown in FIG. 9, a projecting portion 69 projecting toward the inner side of a door opening may be provided at a joint portion between the side sill 16 and a front lower end of the B pillar (i.e., center pillar) 14, and the acceleration sensor 18 may be disposed inside the projecting portion 69 at a position facing the front side door 12. Similarly, a projecting portion 71 projecting toward the inner side of the door opening may be provided on an upper portion of a rear end of the side sill 16, and the acceleration sensor 18 may be disposed inside the projecting portion 71 at a position facing the rear side door 66.

What is claimed is:

1. A collision sensing apparatus for detecting a side collision of a vehicle, comprising:

a vehicle frame member, and an acceleration sensor disposed on said frame member for detecting an acceleration occurring due to a side collision against a center pillar from an outer direction of the vehicle, and for detecting an acceleration occurring as a result of a transmission of a displacement load based on a deformation of a door and oriented toward an interior of a vehicle compartment that occurs due to a side collision against the door from an outer direction of the vehicle.

2. A collision sensing apparatus according to claim 1, wherein said acceleration sensor is mounted so as to be relatively displaceable with respect to the frame member in conjunction with the deformation of the door toward the interior of the vehicle compartment.

3. A collision sensing apparatus according to claim 2, wherein said acceleration sensor is mounted at a position on the frame member which is located between a longitudinally central portion of the door and a pillar provided in the rear of the door.

4. A collision sensing apparatus according to claim 1, wherein said acceleration sensor is mounted at a position on the frame member which is located between a longitudinally central portion of the door and a pillar provided in the rear of the door.

5. A collision sensing apparatus according to claim 1, further comprising:

a mounting member for mounting said acceleration sensor on the frame member.

6. A collision sensing apparatus according to claim 5, wherein said mounting member is a bracket joined to a side sill constituting the frame member.

7. A collision sensing apparatus according to claim 5, wherein said mounting member is a projecting portion joined to a floor cross member and a side sill which constitute the frame member.

8. A collision sensing apparatus according to claim 5, wherein said mounting member includes a threadedly engaging member which can be passed through a slit formed in a floor cross member constituting the frame member and a flange which is provided on said acceleration sensor and through which said threadedly engaging member can pass.

9. A collision sensing apparatus according to claim 5, wherein said mounting member is disposed so as to be spaced apart a predetermined distance from the door.

10. A collision sensing apparatus for detecting a side collision of a vehicle, comprising:

a vehicle frame member, and an acceleration sensor disposed on said frame member for detecting an acceleration occurring due to a side collision against a center pillar from an outer direction of the vehicle, and for detecting an acceleration occurring as a result of a transmission of a displacement load based on a deformation of a door and oriented toward an interior of a vehicle compartment that occurs due to a side collision against the door from an outer direction of the vehicle, wherein said acceleration sensor is mounted at a position on the frame member which is located between a longitudinally central portion of the door and a pillar provided in the rear of the door.

11. A collision sensing apparatus according to claim 10, wherein said acceleration sensor is mounted so as to be relatively displaceable with respect to the frame member in conjunction with the deformation of the door toward the interior of the vehicle compartment.

12. A collision sensing apparatus according to claim 10, further comprising:

a mounting member for mounting said acceleration sensor on the frame member.

13. A collision sensing apparatus according to claim 12, wherein said mounting member is a bracket joined to a side sill constituting the frame member.

14. A collision sensing apparatus according to claim 12, wherein said mounting member is a projecting portion joined to a floor cross member and a side sill which constitute the frame member.

15. A collision sensing apparatus according to claim 12, wherein said mounting member includes a threadedly engaging member which can be passed through a slit formed in a floor cross member constituting the frame member and a flange which is provided on said acceleration sensor and through which said threadedly engaging member can pass.

16. A collision sensing apparatus according to claim 12, wherein said mounting member is disposed so as to be spaced apart a predetermined distance from the door.

* * * * *